United States Patent Office 3,582,367
Patented June 1, 1971

3,582,367
CORROSION-PROOFING COMPOSITION
AND METHOD
Charles R. Miller, Ashland, Ky., and Paul J. Holtzapfel,
Ironton, Ohio, assignors to Ashland Oil & Refining
Company, Houston, Tex.
No Drawing. Filed June 19, 1968, Ser. No. 738,114
Int. Cl. C09d 5/08; C08h 13/00
U.S. Cl. 106—14                               10 Claims

ABSTRACT OF THE DISCLOSURE

Bituminous compositions containing particles of inorganic filler which are highly resistant to settling, the particles of inorganic filler being individually coated with a water-insoluble salt of a waxy hydrocarbon organic acid. Method of preparing compositions containing a bitumen and an inorganic filler in which the filler is dispersed in a solvent solution of water-insoluble organic acid salt. Method of protecting vehicular underbodies by applying thereto compositions of the above-described character.

BACKGROUND

Bituminous compositions based on various types of natural and synthetic asphalts and pitches are known. When first introduced, they had a tendency to spray in a stringy fashion. Later, the stringiness was reduced by incorporating therein relatively large amounts of inorganic particulate (including fibrous) filler, e.g., 20% by weight of asbestos or natural clay. Unfortunately, such fillers have a strong tendency to settle to the bottom of a storage container. This problem has been especially acute with asbestos fibers but also occurs in varying degree with other fillers. In many cases, some settling may occur in a few days. In the course of several months, settling may progress to such an extent as to defy redispersion by normal manual or light mechanical stirring. When this happens, the container of settled coating material must be disposed of or possibly returned to the factory for redispersion. In either event, the economic loss is substantial and where the material has "irreversibly" settled while in a customer's storage facility, ill-will is often generated.

In an attempt to solve the foregoing problem, semi-refined natural amine extracts, such as lecithin, and tall oil and other adjuvants have been added to the filled bituminous compositions. They have resulted in some improvement, but have not solved the problem altogether. For instance, drums of filled asphalt spray coatings containing such adjuvants were tested after standing for 9–10 months at ambient temperature. A strong differential between the viscosities of samples withdrawn from the top and bottom of each drum was noted, thus indicating substantial settling. Accordingly, there is a need for improvements in the storage-stability of filler-containing bituminous coating compositions, and the principal object of this invention is to fulfill that need. Other objects and advantages of the invention will be discernible by those skilled in the art from the remainder of this specification.

In accordance with the invention, we have provided bituminous coating compositions containing particles of inorganic filler, which particles are individually covered with a layer of a water-insoluble salt of a waxy hydrocarbon oxidate. The bituminous material may be of coal, petroleum or synthetic origin and may be of any desired consistency so long as it possesses a softening point higher than the conditions under which it is to be used. In most instances, this implies a softening point by the Ring and Ball method of at least about 110° F. The bitumen may be present alone or combined with or partly replaced by various other film-forming substances such as waxes, resins and the like. The inorganic particles may comprise up to 50% by weight of the total solids content of the coating material and will ordinarily constitute at least about 5% of the total. "Solids" as used herein refers to those materials in the composition which are not volatile under the conditions of application and use of the composition, so that they remain after the coating has been applied and dried to whatever extent it is capable. Thus for instance, quick-drying solvents, volatile at ambient temperature, would be excluded from the solids basis. By "particles" is meant finely divided pieces of the inorganic material which will pass a 10 mesh, preferably a 65 mesh Tyler screen, but no particular limitation as to shape is intended. The foregoing sizes are well adapted for brush-on compositions. For spray type application, the composition, including the wet particles contained therein, should pass a 200 mesh screen. Thus, the particles may be spherical, fibrous, nodular, platy, acicular or any other desired shape. The filler may therefore be a talc, clay, asbestos, hydrated magnesium silicate, characterized by platy, nodular and fibrous particles and other inorganic fillers. The water-insoluble salt of a waxy hydrocarbon oxide should be present in the coating compositions, in an amount of about ⅓ part to about 3 parts by weight per part of inorganic filler. When the ratio of the salt to the filler is near the lower end of the aforesaid range, it appears that the salt is for the most part distributed over the surfaces of the particles. However, as the ratio is increased, there is an excess of the salt, and under certain conditions of manufacture of the coating material, the excess is distributed throughout the bitumen and becomes part of the bituminous matrix in which the coated inorganic particles are held in the applied coating.

The foregoing are the essential ingredients of the compositions of the invention. Such compositions "consist essentially of" these essential ingredients. By this, it is meant that the compositions contain the essential ingredients plus any other desirable ingredients which do not destroy the function of any of the essential ingredients. As other desirable ingredients may be mentioned, solvents, gelling agents, corrosion inhibitors, plasticizers and other useful additives.

A composition prepared in accordance with the invention has been found to resist settling to a remarkable extent. Measurement of the viscosity of samples of material withdrawn from the top and bottom of a 55 gallon drum after one year of storage at ambient temperature disclosed a viscosity difference of only 5% between the samples.

The compositions of the invention may be readily prepared by bringing the normally solid (at room temperature) salt of the waxy hydrocarbon oxidate into a fluid condition. This may be accomplished through heating, dissolving in a volatile (at room temperature) solvent, or both. The particulate filler is then brought together with the liquid salt. To obtain any advantages from the invention, it is essential that at least about one-third of the filler be thoroughly mixed with a sufficient portion of liquid salt to completely wet the particles before either said portion of salt or said one-third of the filler is contacted with the bituminous material. To obtain maximum benefit from the invention, all of the filler should be contacted with enough liquid salt to wet out the particles prior to contact with the bitumen. Part or all of the salt may be used in this wetting-out step. Following the wetting-out step, the bitumen, which has also been brought to liquid condition by the action of heat or solvents or both, is admixed with the wetted-out filler. Any filler, or salt, or both, which have been held out of the wetting-out step may be combined with the wetted-out material before, during or after the admixture of the bitumen. The combined ingredients are then subjected to agitation for a time and at an intensity sufficient to substantially homogeneously disperse the coated filler, any excess salt (beyond that required to coat the filler particles) and other ingredients (if any) throughout the bitumen. The salt, having a preferential attraction for the inorganic filler remains in place, at least to the extent of a monomolecular layer, on the surface of the filler particles. This seems evident in view of the fact that when the filler is not pre-wetted with the salt, a composition which is in all other respect similar to that of the invention does not display the same remarkable settling resistance.

Surprisingly, we have found that compositions of the invention possess other important advantages when employed in the coating of vehicular underbodies. Such compositions discharge smoothly from so-called "airless spray" guns with a minimum of overspray, dripping and sagging, and yet are sufficiently fluid to penetrate and coat crevices and close-fitting joints in the object being coated. They are useable over a wide temperature range. The dried undercoating is highly resistant to the action of brine, impact, abrasion, and weathering, and is unusually and substantially free of any tendency to absorb or "wick" moisture, so as to prevent corrosion-inducing moisture and oxygen from initiating rust beneath its surface.

DESCRIPTION OF PREFERRED EMBODIMENTS

The preferred compositions in accordance with the invention contain the following ingredients in the following indicated percentages by weight: about 25% to about 75% (preferably about 30 to 70%) of oxidized asphalt having a Saybolt Furol Viscosity of about 30 to about 100 (preferably about 35 to 65), a negative Oliensis, a melting point in the range of about 180° F. to about 230° F. (preferably about 200 to 220° F.), and a needle penetration of about 20 to about 40 (preferably about 25 to 35); about 15% to about 50% (preferably about 15 to 40%) of a particulate, inorganic, inert filler such as asbestos, hydrated magnesium silicate or clay or a mixture thereof; about 1% to about 40% (preferably about 5 to 30%) of a water insoluble metal salt of a waxy hydrocarbon oxidate characterized by an acid number in the range of about 20 to about 50; about 1% to about 9% (preferably about 3 to 6%) of an organophilic modified clay; the basis of the foregoing percentages being the total weight of said asphalt, filler, salt and clay in said composition; and sufficient volatile hydrocarbon solvent to render said composition sprayable.

Oxidized asphalt is a well-known asphaltic material prepared by blowing a stream of oxygen-bearing gas, usually air, usually at an elevated temperature, through such materials as, for example, sludge oil, residual oil, cylinder stock, straight run or vacuum reduced asphalt obtained by vacuum distilling a reduced crude petroleum, residual oil or comparable material, asphaltic crude oils, and so forth. Various combinations of these materials may be used.

The Oliensis of an asphaltic material, which may be either positive or negative, is determinable by a test called the "Oliensis Asphalt Spot Test." This test is fully described in the American Association of State Highway Official's Bulletin entitled "Highway Material," page 113 et seq. 1942.

The preferred form of hydrated magnesium silicate filler for the compositions of the present invention is mined near Gouverneur in St. Lawrence County of New York State, and it includes three different species of particles. There are nodular, fibrous and platy particles, the presence of all three of which in appreciable amounts distinguishes the particle analysis of this material from conventional talcs. The platy and nodular particles together should constitute at least a third and preferably a half of the total weight of the particle-form filler.

The preferred form of asbesos for use in the invention is a by-product of the manufacture of the longer grades of asbestos fibers used in shingles, spinning and paper and the so-called "shorts" used in floor tiles, friction materials and so forth. At the asbestos mill the asbestos ore is reduced to pieces of about 1 inch in size which are fed to hammer mills in which the fiber is released from the rock. The fibers are then picked up by air blasts from classifying screens and collected in cyclone collectors. The longer fibers and shorts separate from the air stream in the cyclones, but the "floats" because of their lower density and shorter length are retained in the air streams and are thereafter captured in a separate collection system, cleaned, graded and, to the extent necessary, further treated to control their bulk density. Such "floats" are readily available commercially, and will substantially completely pass through a 10 mesh screen. The preferred floats for use with the invention are prepared from Canadian cresotile ore (slip fiber) from the Pennington Dike and contain at least about 90% by weight of fibers which will when dry pass a 65 mesh screen and be retained on a 100 mesh screen. The following is a typical analysis of the preferred floats material:

Ro-Tap (100 gms., 30 min. Tyler series)
screen test (dry—as received): Percent retained
| | |
|---|---|
| 14 mesh | Trace |
| 28 mesh | 1.0 |
| 35 mesh | 5.0 |
| 100 mesh | 80.0 |
| 200 mesh | 8.5 |
| Pan | 55 |

Bauer McNett screen test:
| | |
|---|---|
| 80 mesh | 0.4 |
| 325 mesh | 9.0 |
| Pan | 90.6 |

Wet Volume 200 ccs. total vol./50 grams asbestos/4 hrs. settling time (agitation conditions per Q.A.M.A. [Quebec Asbestos Mining Association] standards): 500 ccs.

Grit (20 gms.): trace (less than .1%)

Dry Bulk lbs./cu.ft. loosely filled paper or jute bag: 12.5

In general, the water insoluble salt used in the present invention is derived by oxidizing a smooth, unctious, long-fibered waxy hydrocarbon material such as petrolatum. The property of "fiber" is recognized in the grease art and may be observed in a wax by squeezing some wax between two fingers and then spreading them apart. As the fingers spread, elongated "fibers" or "strings" of wax stretch out between the fingers and eventually part. Such waves may be obtained from any suitable petroleum fractions or crudes.

There are various well-known oxidation procedures, such as those involving blowing with air or oxygen at elevated temperatures with or without catalysts. Such procedures are exemplified by U.S. Patents 1,863,004; 2,043,923; 2,156,226; 2,186,910 and 2,216,222. The waxy hydrocarbon should be blown to an acid number of at least about 20 (preferably about 20 to about 35, with an acid number of about 28 appearing best). Acid numbers higher than about 50, although not definitely excluded, should be employed with caution because they can lead to soaps which are grainy and less compatible with certain hydrocarbon solvents than those in the 20–50 acid number range.

In order to obtain the soap from the waxy hydrocarbon oxidate, the oxidate is substantially completely neutralized by reacting it with the hydroxide(s), oxide(s), carbonate(s) or other basic compound(s) of any selected metal(s). The resultant material is a water insoluble salt which has been referred to in the art as "wax soap." Among the many basic compounds which may be used to neutralize the acidic waxy hydrocarbon oxidate are the oxides and/or hydroxides of polyvalent metals having water-insoluble hydroxides, such as calcium, barium, magnesium, zinc, iron and lead. Lime is a particularly preferred neutralizing agent.

The organophilic modified clays which may be used in the compositions of the present invention are well-known. They are prepared by substituting an organic onium base for the exchangeable inorganic cation of a natural or synthetic clay, thus altering the natural tendency of such clays to absorb water and making said clays capable of swelling in organic media. The most preferred organophilic clays are prepared by reacting Bentonite clay with quaternary ammonium compounds in which the N-substituents are aliphatic groups containing at least one alkyl group having a total of at least 10 to 12 carbon atoms. When aliphatic amines are used they preferably contain an alkyl group with a total of at least 10 to 12 carbon atoms.

The preferred compositions contain a volatile organic solvent or mixture of solvents which has the ability to dissolve the oxidized asphalt and boils below the lubricating oil range. The particularly preferred solvent is petroleum distillate boiling in the range of about 330° F. to about 352° F.

The proper proportion of solvent to solids is easily determinable by one of ordinary skill in the art in the light of the application desired and the requirements of the equipment available. Preferably, the amount of solvent should be such as to provide a viscosity in the range of about $6 \times 10^4$ to about $1.0 \times 10^5$ cps., as measured at 77° F. with a Brookfield RVT viscosimeter, number 7 spindle, operating at 10 r.p.m.

It has been found beneficial to incorporate in compositions for automotive undercoating a small amount, e.g. about 1% to about 5% by weight on the entire composition, of an organic corrosion inhibitor, many examples of which are known to persons skilled in the art. The presently preferred corrosion inhibitor is prepared by sufonating any of various petroleum hydrocarbon oil fractions, such as gas oil, kerosene, light oil, turbine oil, lube oil, or heavy oil, with a sulfonating agent such as sulfuric acid, oleum, chlorosulfonic acid, sulfur trioxide and their mixtures. The resultant sulfonated hydrocarbon material is neutralized to form the sodium salt, e.g. by mixing with caustic, and is then recovered from the remainder of the hydrocarbon fraction, e.g. by extraction with aqueous alcohol. The extracted material is referred to as "sodium sulfonate." In like manner, a wide variety of oil-soluble, water insoluble metallo petroleum sulfonate salts can be obtained, which, as a class, are effective as rust inhibitors when present in amounts of about 1% and higher. The preferred salts are those of the alkali, alkaline earth and heavy metals.

During the preparation of the compositions of the invention, certain additives may be used, if desired, to assist in the gellation of the organophilic modified clay(s). For instance, we employ small amounts, e.g. about 1% to about 4% by weight on the whole composition, of propylene carbonate or a lower alkanol having 1 to 6 carbon atoms. Small amounts of butyl Cellosolve may also be employed. Also, the addition of water, e.g. up to about 10% by weight on the whole composition, has been found to be of assistance in gelling the clay.

The following examples, in which all parts are by weight, illustrate the invention:

EXAMPLE 1

The following composition is prepared:

| Component | Weight percent "wet" basis | Weight percent "dry" basis |
| --- | --- | --- |
| Asphalt | 22.0 | 36.7 |
| Soap | 15.9 | 26.5 |
| Clay | 2.5 | 4.2 |
| Sodium sulfonate | 1.6 | 2.7 |
| Hydrated magnesium silicate | 10.0 | 16.7 |
| Asbestos floats | 8.0 | 13.2 |
| Methanol | 1.0 | |
| Water | 5.0 | |
| Solvent | 34.0 | |
| | 100.0 | 100.0 |

The manner of preparation of the ingredients and the sequence of mixing are as follows:

A highly paraffinic petroleum from a Pennsylvania crude having about 35 to about 70 carbon atoms per molecule is oxidized to an acid number of 28.5. 14.1 parts of the resultant waxy oxidate are heated to 350° F. and are agitated while 0.7 part of lime are incorporated. The resultant mixture is agitated at 350° F. for about an hour. Then, as the mixture is cooled, 13.7 parts of an essentially aliphatic solvent boiling in the range of 310° F. to 365° F. are added to make a cut-back "soap." Into the soap is stirred all of the asbestos floats as above descrived. Agitation proceeds for a period of about ½ hour at ambient temperature.

Cylinder stock from an Illinois crude is blown for 36 hours at a temperature of 500° F. at an air rate of .03 cubic feet of air per gallon of oil per minute to produce an oxidized asphalt having a negative oliensis, a Saybolt Furol Viscosity of 45, a softening point of 210° F., and a needle penetration of 30 mm. (77° F., 5 seconds, standard (ASTM) 100 gram needle.) Shortly after the asphalt has cooled to a temperature below the boiling point of the solvent, it is cut-back with the above-described preferred solvent in a ratio of 42 parts solvent per 58 parts oxidized asphalt.

The soap and asbestos floats mixture are next blended with the sodium sulfonate and the cut-back asphalt just described. The resultant mixture is agitated thoroughly. As agitation continues, the clay (Baragel 24), which is dimethyldioctadecyl onium bentonite, and NYTAL 200 (trade name) hydrated magnesium silicate filler, are gradually incorporated. The filler has a specific gravity of about 2.85, a pH (ASTM D-1208—52T4a) of about 9.5, a Hegman Fineness (ASTM D-605-53T) of 0, a Consistency (Krebs Units) KU of 72, a maximum of about 2% by weight of particles that will not pass a 325 mesh sieve, an oil absorption (ASTM D-1483-60, Gardner-Coleman) of about 36 and a particle size analysis in accordance with the values set forth in the following table:

PARTICLE SIZE BY SEDIMENTATION

Weight percent finer than—

| | |
| --- | --- |
| 20 microns | 88 |
| 10 microns | 67 |
| 7 microns | 55 |
| 5 microns | 45 |
| 3 microns | 34 |
| 2 microns | 28 |
| 1 microns | -- |

In the material employed in the present example, the platy and nodular particles are present in about equal weights and together constitute a predominant proportion, e.g. about 60%, of the total weight of the filler. Mixing is continued as the temperature of the mixture is raised to about 160° F. and all the filler solids are wetted by the asphalt. Then, 2 parts of methyl alcohol and 5 parts of water are added to the agitated mixture to assist in gelling the same, whereupon the mixture gels. The gelled mixture is then processed through a Charlotte colloid mill with a 0.004" rotor clearance and a sieve with 0.005" openings. The resultant material is found to have a viscosity, as measured by a Brookfield RVT Viscosimeter at 77° F. with a No. 7 spindle of 400,000 at 0.5 r.p.m., 80,000 at 10 r.p.m. and 20,000 at 50 r.p.m.

EXAMPLE 2

The procedure of Example 1 is repeated except that the amounts of the ingredients are altered to conform to the following analysis:

| Component | Weight percent "wet" basis | Weight percent "dry" basis |
|---|---|---|
| Asphalt | 33.2 | 52.7 |
| Soap | 8.0 | 12.7 |
| Clay | 2.0 | 3.2 |
| Sodium sulfonate | 0.8 | 1.3 |
| Hydrated magnesium silicate | 5.0 | 7.9 |
| Asbestos floats | 14.0 | 22.2 |
| Methanol | 2.0 | |
| Water | 1.0 | |
| Solvent | 34.0 | |
| | 100.0 | 100.0 |

EXAMPLE 3

The procedure of Example 1 is followed except that the NYTAL is omitted and the amounts of the ingredients are altered to conform to the following analysis:

| Component | Weight percent "wet" basis | Weight percent "dry" basis |
|---|---|---|
| Asphalt | 29.0 | 58.0 |
| Soap | 11.0 | 22.0 |
| Clay | 3.0 | 6.0 |
| Sodium sulfonate | 1.0 | 2.0 |
| Asbestos floats | 6.0 | 12.0 |
| Methanol | 1.0 | |
| Water | 1.0 | |
| Solvent | 48.0 | |
| | 100.0 | 100.0 |

EXAMPLE 4

A composition in accordance with Example 1 is placed in a sealed one gallon container 7½ inches tall and 6½ inches in diameter and is left undisturbed at ambient temperatures for a period of 24 months, following which 500 gram samples are withdrawn from the top and bottom of the container and their properties are determined. The results are as follows:

| Material | Top | Bottom |
|---|---|---|
| Viscosity, centipoise | 80,000 | 76,000 |
| Unworked penetration | 383 | 380 |
| Analysis, ash percent wt | Identical | |

The viscosity was determined with a Brookfield RVT Viscosimeter #7, spindle 10 r.p.m. and at 77° F.

What is claimed is:

1. A bituminous composition consisting essentially of: about 15 to about 50% by weight on a solids basis of particulate inorganic filler particles which will pass a 10-mesh sieve wherein at least certain of said inorganic filler particles bear a coating of water-insoluble salt of waxy hydrocarbon oxidate, said coated inorganic filler particles having a weight equal to at least one-third of the total weight of all said inorganic filler particles, the total weight of said salt in said composition on a solids basis being in the range of about 1% to about 40% by weight; and about 25% to about 75% on a solids basis of bitumen, which surrounds the filler particles that bear the coating of water-insoluble salt of waxy hydrocarbon oxidate.

2. A composition in accordance with claim 1 wherein the filler includes asbestos fibers.

3. A composition in accordance with claim 1 wherein the waxy hydrocarbon oxidate includes petrolatum which has been oxidized to an acid number in the range of about 20 to about 50.

4. A composition in accordance with claim 1 wherein the bitumen includes oxidized asphalt having a melting point in the range of about 180° F. to about 230° F. (ring and ball) and responds negatively to the Oliensis Test.

5. A composition in accordance with claim 1 wherein all of the filler particles bear a coating of said water-insoluble salt of waxy hydrocarbon oxidate.

6. A method of protecting a substrate from the effects of corrosion comprising applying thereto a layer of the composition of claim 1.

7. A method of preparing a bituminous composition containing a particulate organic filler, a water-insoluble salt of waxy hydrocarbon oxidate and a bitumen, comprising coating at least one-third by weight of said particles with a sufficient amount of said salt to wet out the particles and then, after said particles have been thus wetted out, mixing them with said bitumen.

8. A method in accordance with claim 7 wherein the waxy hydrocarbon oxidate includes petrolatum which has been oxidized to an acid number in the range of about 20 to about 50.

9. A method in accordance with claim 7 wherein the bitumen includes oxidized asphalt having a melting point in the range of about 180° F. to about 230° F. (ring and ball) and responds negatively to the Oliensis Test.

10. A method in accordance with claim 7 wherein all of the filler particles bear a coating of said water-insoluble salt of waxy hydrocarbon oxidate.

References Cited

UNITED STATES PATENTS

| | | | |
|---|---|---|---|
| 2,421,672 | 6/1947 | Wilson et al. | 106—14 |
| 2,923,639 | 2/1960 | Wilkinson | 106—382 |
| 3,025,179 | 3/1962 | Holbein | 106—308Oxy |
| 3,434,851 | 3/1969 | Miller. | |

JULIUS FROME, Primary Examiner

J. B. EVANS, Assistant Examiner

U.S. Cl. X.R.

106—269, 281, 282, 308; 252—388